J. H. POPE.

HEEL GOUGING AND LIP CUTTING MACHINE.

APPLICATION FILED MAR. 13, 1922.

Reissued Sept. 5, 1922.

15,448.

3 SHEETS—SHEET 1.

INVENTOR

Joseph H. Pope

By his Attorney,

Nelson W. Howard

J. H. POPE.

HEEL GOUGING AND LIP CUTTING MACHINE.

APPLICATION FILED MAR. 13, 1922.

Reissued Sept. 5, 1922. 15,448.

3 SHEETS—SHEET 2.

INVENTOR

Joseph H. Pope

By his Attorney

Nelson W. Stanford

J. H. POPE.

HEEL GOUGING AND LIP CUTTING MACHINE.

APPLICATION FILED MAR. 13, 1922.

Reissued Sept. 5, 1922. 15,448.

3 SHEETS—SHEET 3.

INVENTOR

Joseph H. Pope

By his Attorney

Nelson W. Morsbach

Reissued Sept. 5, 1922.

Re. 15,448

UNITED STATES PATENT OFFICE.

JOSEPH H. POPE, OF HAMILTON, MASSACHUSETTS, ASSIGNOR TO UNITED SHOE MACHINERY CORPORATION, OF PATERSON, NEW JERSEY, A CORPORATION OF NEW JERSEY.

HEEL-GOUGING AND LIP-CUTTING MACHINE.

Original No. 1,396,143, dated November 8, 1921, Serial No. 262,295, filed November 13, 1918. Application for reissue filed March 13, 1922. Serial No. 543,510.

*To all whom it may concern:*

Be it known that I, JOSEPH H. POPE, a citizen of the United States, residing at Hamilton, in the county of Essex and State of Massachusetts, have invented new and useful Improvements in Heel-Gouging and Lip-Cutting Machines, of which the following is a specification.

This invention relates to cutting machines and is herein illustrated as embodied in a machine for forming a properly shaped concavity in the upper surface of a heel preparatory to attaching it to a shoe and breasting it.

In the manufacture of certain kinds of shoes the heel blanks are commonly formed with a concavity in their upper faces to fit the convexity of the heel end of the sole and also with a scallop at the breast end of the heels which is deeper than the concavity. Such blanks are commonly produced by operating upon them first in a heel gouging machine which roughs out the concavity and then in a heel compressor, which, besides compressing the heel, finishes the formation of the concavity and forms the scallop. The scallop is produced by the action of a lip on one die of the mold of the heel compressor; and from this circumstance the scallop has come to be known in the art as a "lip" although it is really the impression made by the lip of the die. The procedure which has been outlined above possesses the disadvantage that the breast end of the heel is condensed to such an extent by the action of the heel compressor that the subsequent breasting operation is rendered difficult; and in order to avoid this difficulty many manufacturers run the gouged heels through a lip cutting machine prior to the compressing operation in which case the degree of condensation at the breast end of the heel is less than would otherwise result.

According to one feature of the present invention the heel gouging and lip cutting are performed in a single operation. In the illustrated machine the heel is clamped in a holder and moved past a properly shaped rotary cutter so that the heel is traversed by the cutter from a point near the rear of the heel to the breast edge, means being provided for increasing the depth of the cut at the breast end to form the "lip" or scallop.

Other features of the invention relate to novel means for clamping and releasing the heel at the proper times and to means for adjusting the machine to vary the depth of the gouging cut.

Referring to the accompanying drawings:—

Figure 1:
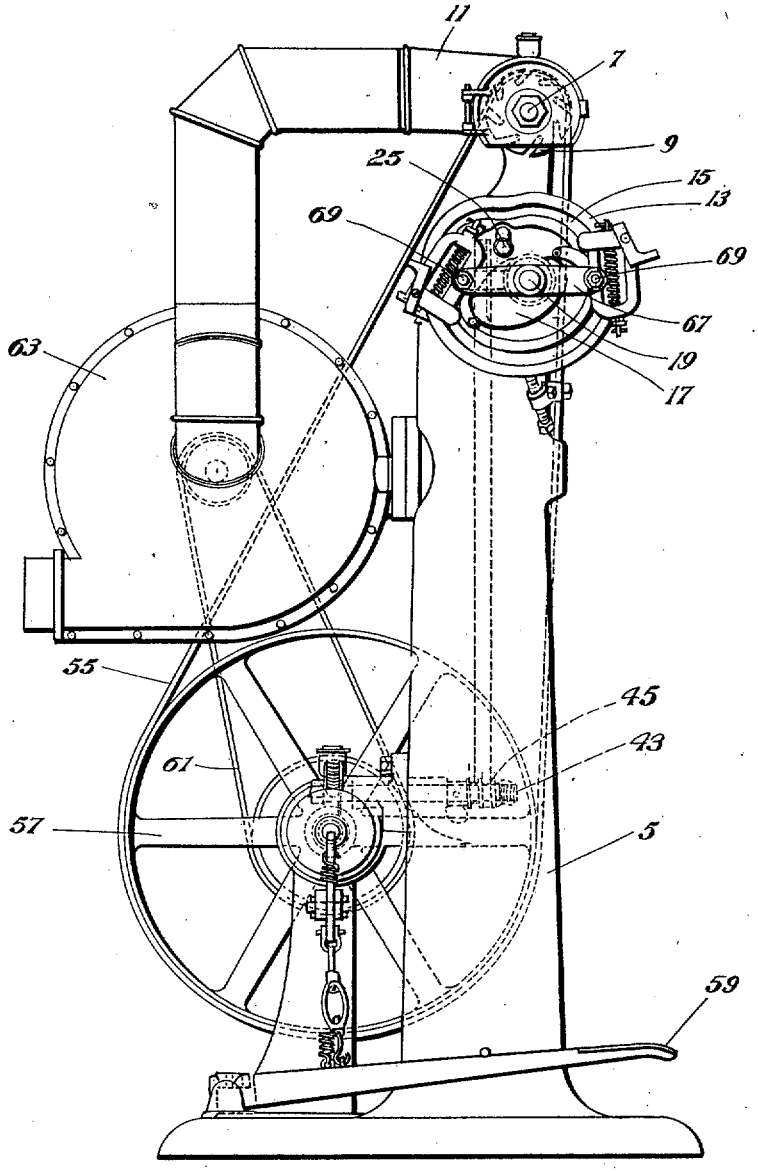
Figure 1 is an elevation of a machine in which the present invention is embodied.
Figure 3:
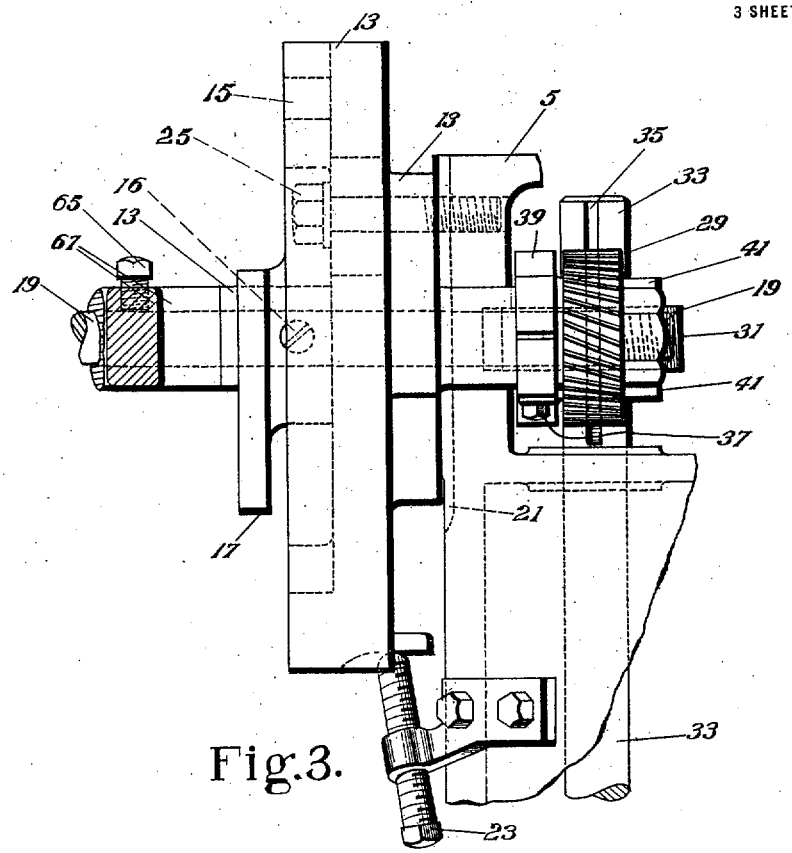
Fig. 3 is an elevation looking to the left as the machine is viewed in Figs. 1 and 2 and showing more particularly the mounting of the shaft by which the work holders are carried.
Figure 4:
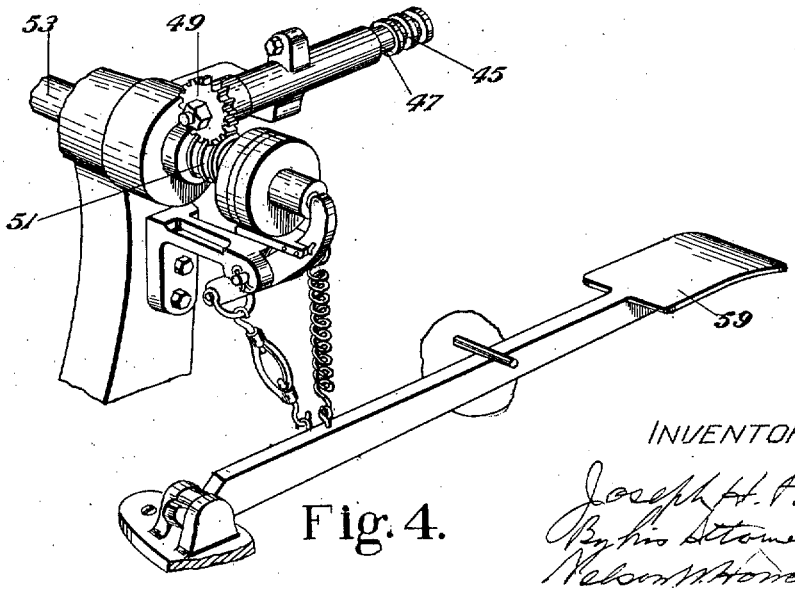
Fig. 4 is a perspective of part of the driving mechanism.

Mounted on the frame 5 of the machine is a rotary shaft 7 upon the end of which a toothed cutter 9 is mounted, a suction conduit 11 being provided to take away the chips and dust. Located below the cutter is a stationary cam member 13 having formed therein a cam track 15 and having adjustably fastened thereto by means of a set screw 16 (see Fig. 3) a cam 17. The purpose of the cam track 15 and the cam 17 is to guide the work holders in their movement past the cutter and to operate the clamp which first holds and then releases the heels. The cam member 13 has formed integral with it the bearings for a rotary shaft 19, said shaft being thus supported entirely by the cam member. To the left of this shaft, as viewed in Fig. 1 or to the rear as viewed in Fig. 3, there is a vertical slot 21 in the frame of the machine into which extends a vertical rib formed on the cam member 13. An adjusting screw 23 furnishes means for raising and lowering the cam member 13, and a screw bolt 25 extending through a slot 27 in the cam member and threaded into the frame of the machine holds the cam member in adjusted vertical position. The purpose of this adjustment is to vary the depth of cut of the rotary cutter 9. The shaft 19 near its rear end carries a spiral gear 29 which meshes with a second spiral gear 31 slidingly mounted upon an upright rotary shaft 33 but held from rotation with respect thereto by means of a key which fits in a keyway 35. Clamped about the hub of the cam member 13 by a pinch bolt 37 is a split collar 39 having extending therefrom a yoke 41 which engages the top and bottom faces of the spiral gear 31 to move it vertically when the cam member 13 is adjusted. The upright shaft 33 has at its lower end a worm gear 43 which meshes with a worm 45 on one end of a short shaft 47 the other end of which carries a worm gear 49 in mesh with a worm 51, the latter being loose on the driving shaft 53. The cutter shaft 7 is driven by a belt 55 which passes around a pulley on the shaft 7 and a pulley 57 on the driving shaft 53. A friction clutch, shown in Fig. 4, the details of which form no part of the present invention, is controlled by a treadle 59 to connect the worm 51 with the driving shaft 53, said latter shaft having the usual tight and loose pulleys and serving through a belt 61 to rotate a blower in a casing 63 which is connected with the suction conduit 11.

Figure 2:
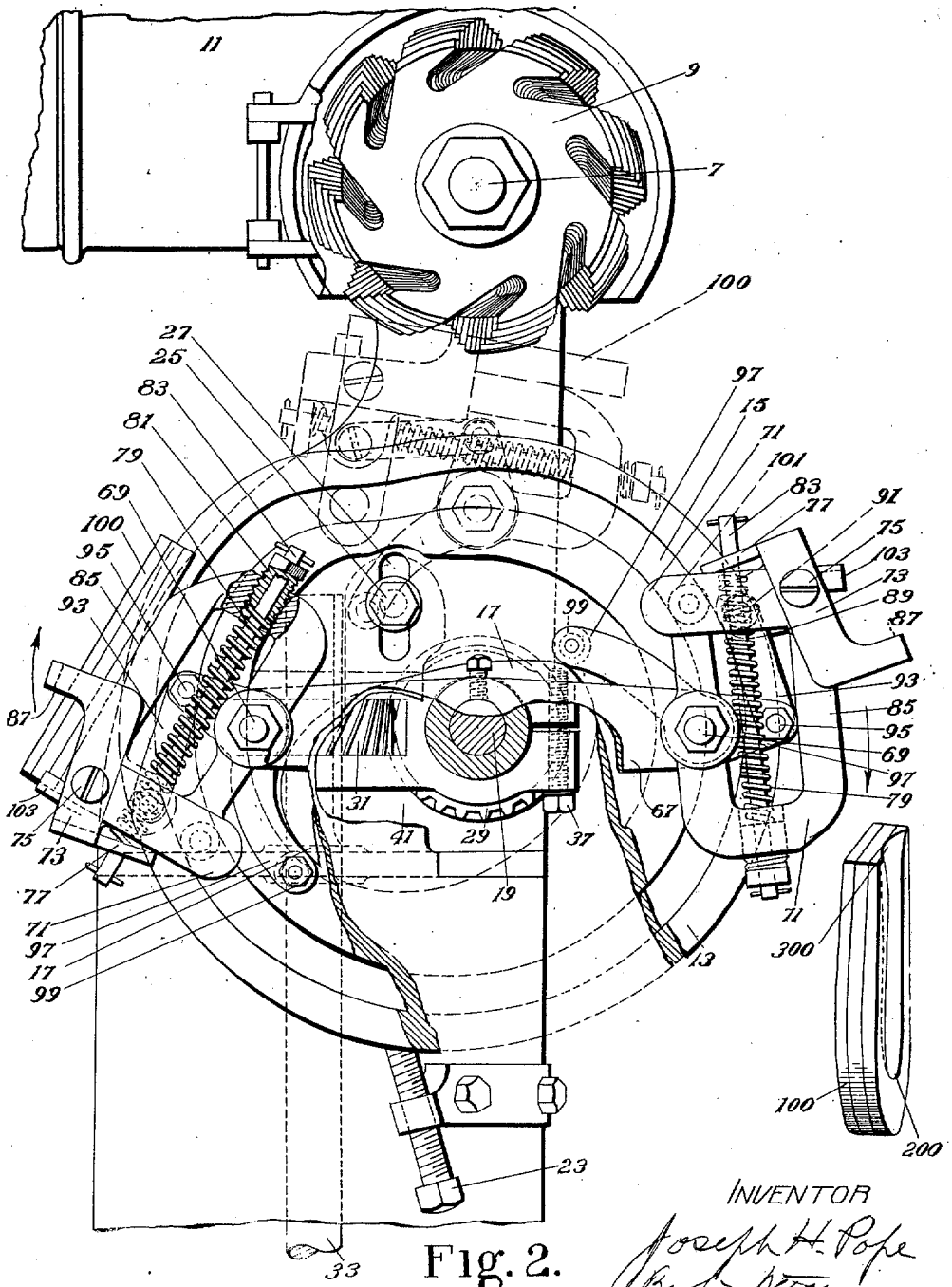
Fig. 2 is an elevation of the head of the machine on an enlarged scale; with certain parts broken away. In this figure one heel is shown as just having been placed in the machine and another as just having been delivered from the machine.

Fastened by a set screw 65 to the shaft 19 is a carrier in the form of a bar 67 to the ends of which at 69 are pivoted work holders which are identical in construction. Each work holder comprises a frame 71 and a clamp 73 which is pivoted to the frame at 75. Each clamp is generally U-shaped with the base of the U extending across the rear end of the frame 71 and provided with a tail 77 against which one end of the coiled spring 79 bears, the other end bearing against a sleeve 81 threaded into a socket in the frame 71. The spring encircles a guide rod 83, which extends through a slot in the tail 77, and tends to swing the clamp in a clockwise direction about its pivot 75. The work supporting face of the work holder lies in a plane parallel to the axis of the shaft 19 passing through the line 85; and when the clamp 73 is swung in a clockwise direction about the pivot 75, ears 87 which extend inwardly over the work supporting face of the holder are caused to approach said work supporting face and thereby to clamp the work 100 firmly in place on the holder. Referring to Fig. 2, in which the direction of rotation of the carriers is indicated by the arrow, the clamp of the right-hand holder has just released a heel which has been operated upon, while the clamp of the left hand holder is descending to grip a heel which has just been placed in the holder. In order to release the work, each clamp has a lug 89 projecting toward the shaft 19 to which is pivoted at 91 one end of a link 93 the other end of which is pivoted at 95 to a lever 97. This lever is pivoted about the axis of the stud 69 and carries at its inner end a roll 99 which is at times engaged by the cam 17 to hold the clamp open.

Each work holder, during its revolution, is moved angularly by a roll 101 which runs in the cam track 15. This cam track is so shaped that the cutter starts at a point 200 near the rear end of the heel and traverses the top of the heel from that point to the breast edge. Just before the breast edge is reached a slight rise in the cam track 15 raises this end of the heel and causes the depth of the cut to be increased at this point to form the scallop or "lip" 300.

In the operation of the machine, power having been applied to the cutter shaft and the blower, the operator stands facing the machine as viewed in Fig. 2 and depresses the treadle. This causes the carrier 67 to be rotated very slowly. The rotation of the carrier brings the work holders successively into operative relation to the cutter. As each work holder reaches the approximate position of the left-hand holder in Fig. 2, the operator places a heel blank on the holder by slipping it under the ears 87 of the clamp and allowing its end to rest against a gage or stop 103 which is rigid with the holder. As this holder moves upwardly toward the cutter, the roll 99 rides entirely off the cam 17 whereupon the spring 79 operates the clamp to grip the heel blank. With the blank firmly gripped, the holder moves past the cutter, as shown in dotted lines in Fig. 2, and as has been explained, the depth of the cut is abruptly increased just before the heel breast is reached.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:—

1. A machine of the class described, having in combination, a cutter, a holder for a heel, and power actuated means for causing the heel to be traversed by the cutter from a point near the rear of the heel to the breast thereof to form a gouge and for increasing the depth of the cut at the breast end to form a lip.

2. A machine of the class described, having in combination, a rotary cutter, means for rotating the cutter, a holder for a heel, means for causing the heel to be traversed by the rotating cutter from a point near the rear of the heel to the breast thereof, and means acting to increase the depth of the cut at the breast end.

3. A machine of the class described, having in combination, a cutter, means for rotating the cutter, a carrier, a heel holder mounted on the carrier, means for rotating the carrier to cause a heel held in the holder to be traversed by the cutter from a point near the rear end of the heel to the breast thereof, and means for moving the holder during the cutting operation to increase the depth of the cut at the breast end of the heel.

4. A machine of the class described, having in combination, a cutter, means for rotating the cutter, a carrier, a heel holder pivotally mounted on the carrier, means for rotating the carrier to cause a heel held in the holder to be traversed by the cutter from a point near the rear end of the heel to the breast thereof, and means for swinging the holder about its pivotal connection with the carrier during the latter part of the cutting operation to increase the depth of the cut at the breast end of the heel.

5. A machine of the class described, having in combination, a cutter, means for rotating the cutter, a carrier, a heel holder mounted on the carrier, and means for rotating the carrier in a path the plane of which coincides substantially with the plane of the path of the cutter to cause the surface of a heel held in the holder to be cut in a direction longitudinally of the heel as it is moved past the cutter.

6. A machine of the class described, having in combination, a cutter, means for rotating the cutter, a carrier, a heel holder mounted on the carrier, means for rotating the carrier in a path the plane of which coincides substantially with the plane of the path of the cutter to cause the surface of a heel held in the holder to be brought into contact with and moved past the cutter, and means for increasing the depth of the cut at the breast end of the heel.

7. A machine of the class described, having in combination, a cutter, a rotary carrier, a heel holder movably mounted on the carrier, means for rotating the carrier to bring a heel held in the holder into contact with the cutter, and means for moving the holder on the carrier during the cutting operation to cause the depth of the cut to be increased at the breast end of the heel.

8. A machine of the class described, having in combination, a cutter, a rotary carrier, a heel holder pivotally mounted on the carrier, means for rotating the carrier to bring a heel held in the holder into contact with the cutter, and means for oscillating the holder on the carrier during the cutting operation to cause the depth of the cut to be increased at the breast end of the heel.

9. A machine of the class described, having in combination, a tool for operating upon a blank, means for operating the tool, a carrier, a blank holder mounted on the carrier, means for producing relative movement between the carrier and the tool to present to the tool a blank held in the holder, yielding means actuated independently of the operation of the tool for clamping the blank on the holder, and means acting intermittently in opposition to the yielding means for releasing the clamp.

10. A machine of the class described, having in combination, a cutter, a rotary carrier, a heel holder mounted on the carrier to expose the top surface of a heel held in the holder for the action of the cutter, means for rotating the carrier to present a heel held in the holder to the cutter, means for operating the cutter, yielding means for clamping the heel on the holder, and means acting intermittently in opposition to the yielding means for releasing the clamping means.

11. A machine of the class described, having in combination, a cutter, a rotary carrier, a heel holder mounted on the carrier, means for rotating the carrier to bring a heel supported on the holder into contact with the cutter, a clamp pivoted to the holder, a spring tending at all times to move the clamp to heel-holding position, and means acting in opposition to the spring for moving the clamp to heel-receiving position after the cutting operation and for holding it in such position to permit the cut heel to fall from the holder and to be replaced by an uncut one.

12. A machine of the class described, having, in combination, a tool, a rotary carrier, a work holder mounted on and movable with respect to the carrier, means for rotating the carrier to bring a piece of work held in the holder into operative relation to the tool, and means whereby the carrier and the tool may be relatively adjusted initially toward and from each other to regulate the depth of action of the tool.

13. A machine of the class described, having in combination, a rotary cutter, a rotary carrier, a heel holder mounted thereon and capable of movement with respect thereto, means for rotating the carrier whereby the holder is revolved and caused in its revolution to travel past the cutter in the plane of rotation of the cutter, means for controlling the movement of the holder with respect to the carrier, and means whereby the distance between the cutter and the axis of rotation of the carrier may be varied while maintaining unchanged the relative position of said axis and said controlling means.

14. A machine of the class described, having in combination, a rotary carrier, a heel holder mounted thereon and capable of movement with respect thereto, means for rotating the carrier whereby the holder is revolved and caused in its revolution to travel past the cutter in the plane of rotation of the cutter, stationary means for controlling the movement of the holder with respect to the carrier, and means whereby the distance between the cutter and the axis of rotation of the carrier may be varied to vary the depth of the cut while maintaining unchanged the relative position of said axis and said controlling means.

15. A machine of the class described, having in combination, a cutter, a rotary shaft, a carrier mounted on the shaft, a heel holder pivotally mounted on the carrier, means for rotating the shaft to move the holder past the cutter in the plane of rotation of the cutter, means for controlling the pivotal movement of the holder on the carrier, and means whereby the distance between the rotary shaft and the cutter may be varied while maintaining unchanged the relative positions of the shaft, the holder and the controlling means to one another.

16. A machine of the class described, having in combination, a rotary cutter, a rotary shaft, a carrier mounted on the shaft, a heel holder mounted on the carrier and movable into different positions with respect thereto, a cam member for controlling the movement of the holder on the carrier, said shaft being supported in bearings in said cam member, and means whereby the cam member and with it the shaft may be adjusted toward and from said cutter.

17. In a machine for forming a concavity in the top or heel seat of heels for boots and shoes, the combination of a rotary cutter, a heel holder, means for relatively traversing the rotary cutter and heel holder to cause the cutter to cut in a direction longitudinally of the top of a heel held in the holder, and means for giving a further relative movement of the cutter and heel holder to cause the cutter to increase the depth of cut at the breast of the heel.

18. A machine of the class described, having in combination, a cutter and power actuated means for causing a heel blank to be traversed by the cutter from a point near the rear of the heel to the breast thereof and acting to change the direction of relative movement of the cutter and blank to increase the depth of the cut at the breast end to form a lip.

19. A machine of the class described, having in combination, a cutter and power actuated means for seizing a heel blank and for moving it past the cutter from a point near the rear of the blank to a point near the front end thereof, said means then being effective to change the angle of cut to increase the depth of the cut to a predetermined extent at the front end.

20. A machine for simultaneously gouging and lip-cutting heel blanks comprising, in combination, a cutter, and power-operated means for feeding a heel blank past the cutter and relatively moving the blank and the cutter to gouge the seat surface of the blank and to cut a scallop or "lip" at the breast end of the gouged surface.

21. A machine for simultaneously gouging and lip-cutting heel blanks comprising, in combination, a cutter, a support to engage a heel blank and power-operated means relatively to traverse the cutter and a blank on the support and relatively to move the blank and the cutter to vary the depth of the cut, to produce a compound gouging cut on the seat surface of the blank providing a cavity to fit the seat surface of a shoe and an adjoining scallop or "lip" of the form described.

22. A machine for gouging and lip cutting the seat surfaces of multiple-lift heels comprising, in combination, cutting means, and means for feeding a flat heel past said means first to form a gouged seat surface and then to form a scallop or "lip" at the breast end of the heel at a greater depth than that of the gouged surface.

23. A gouging and lip-cutting machine comprising, in combination, cutting means to form a scallop or "lip" at the breast end of a heel and to form a shallower gouged seat surface adjoining the lip, and feeding means to present a plurality of heels in succession to the cutting means.

In testimony whereof I have signed my name to this specification.

JOSEPH H. POPE.